UNITED STATES PATENT OFFICE.

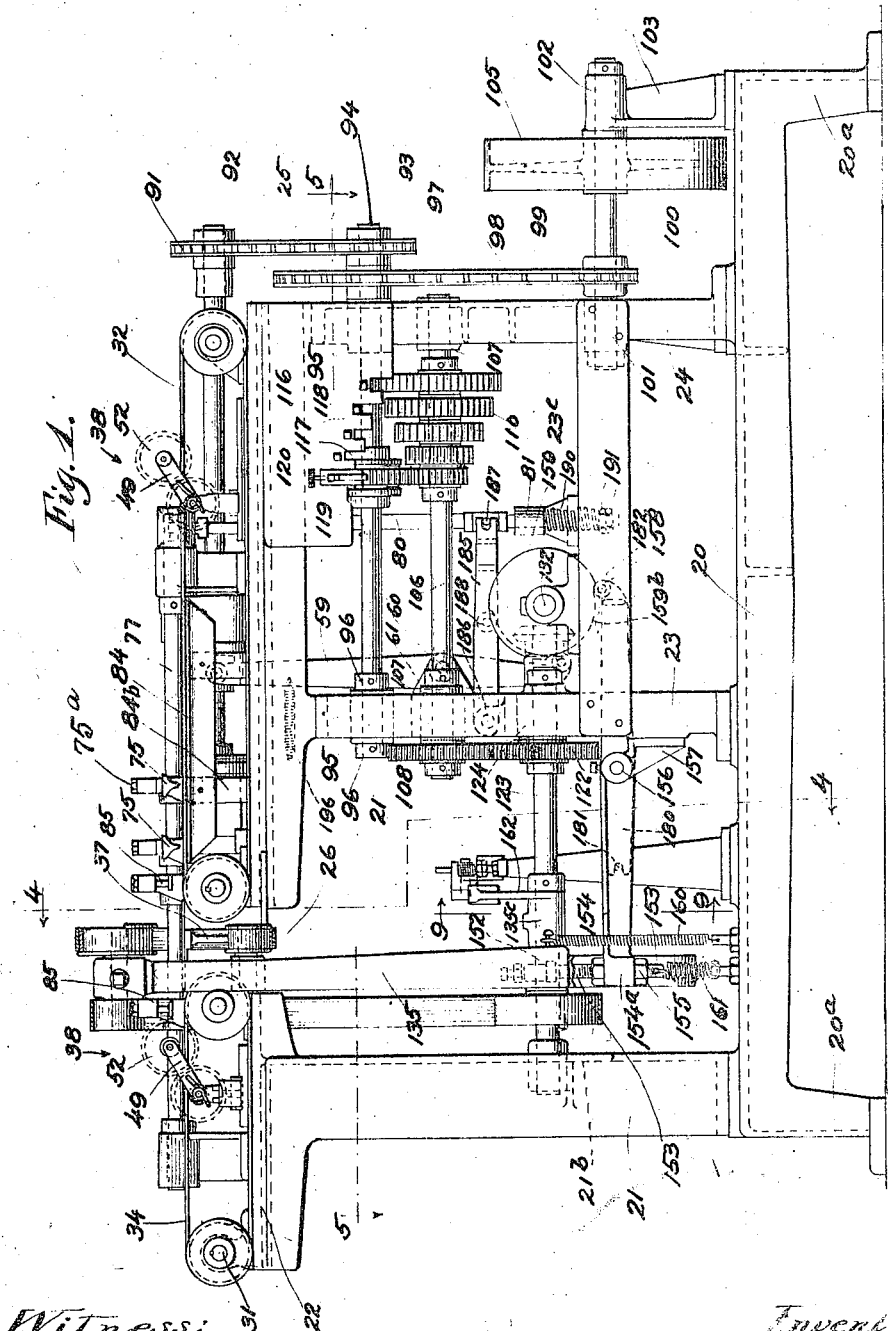

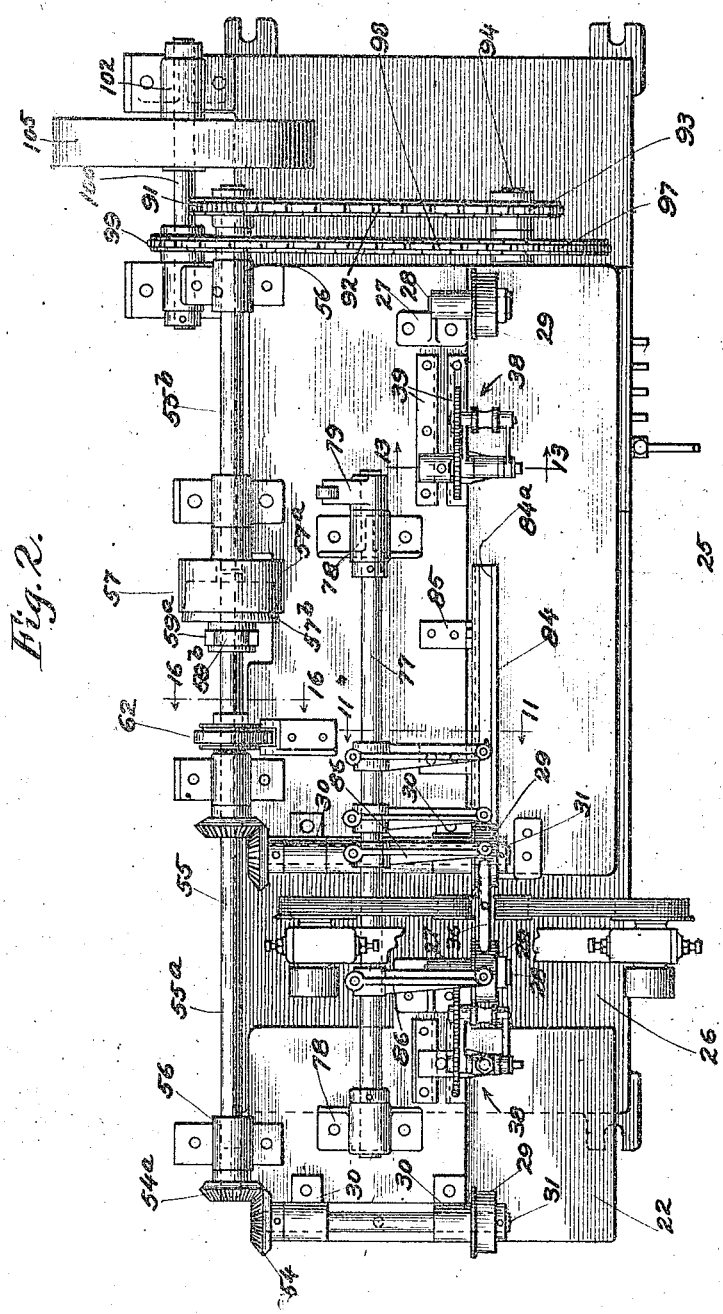

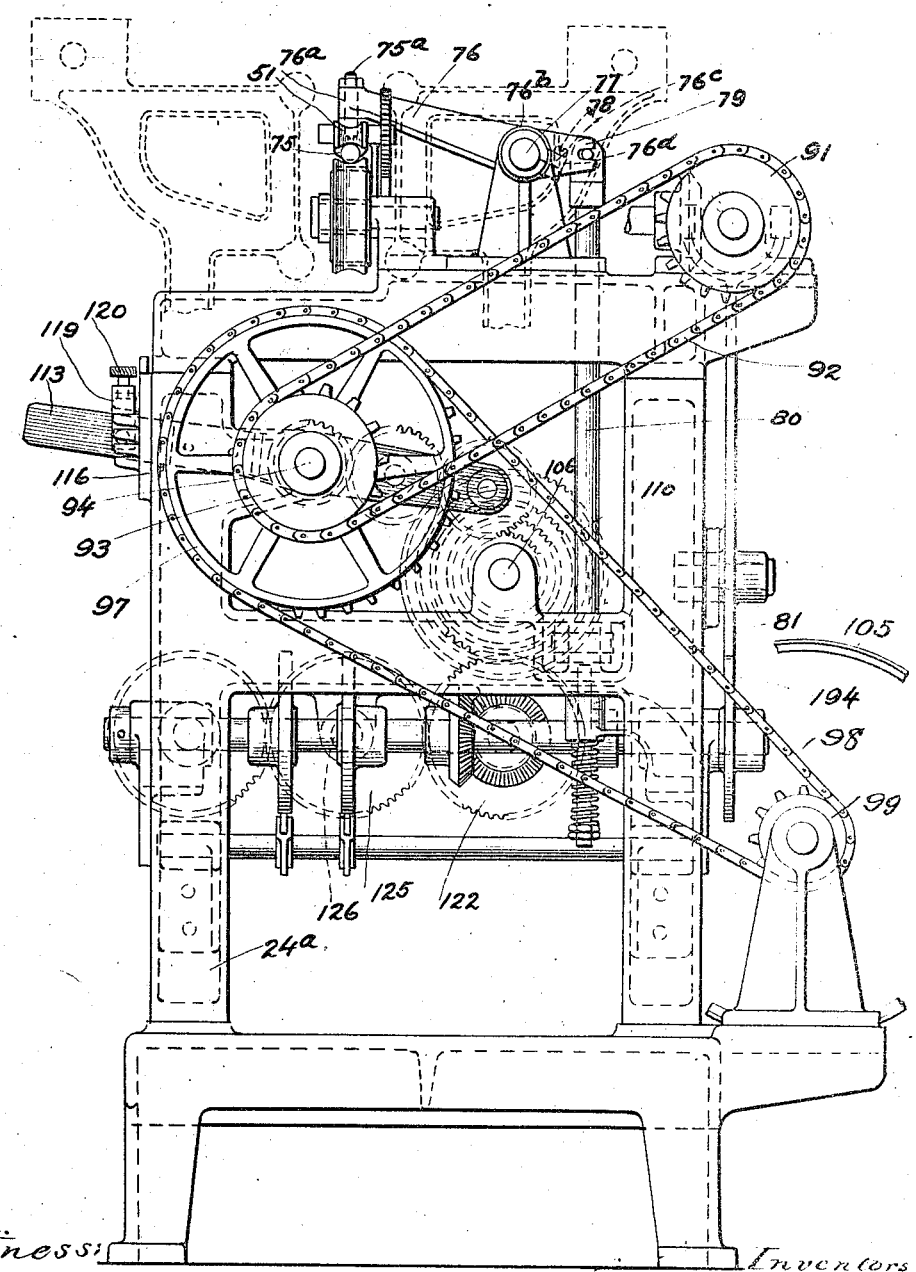

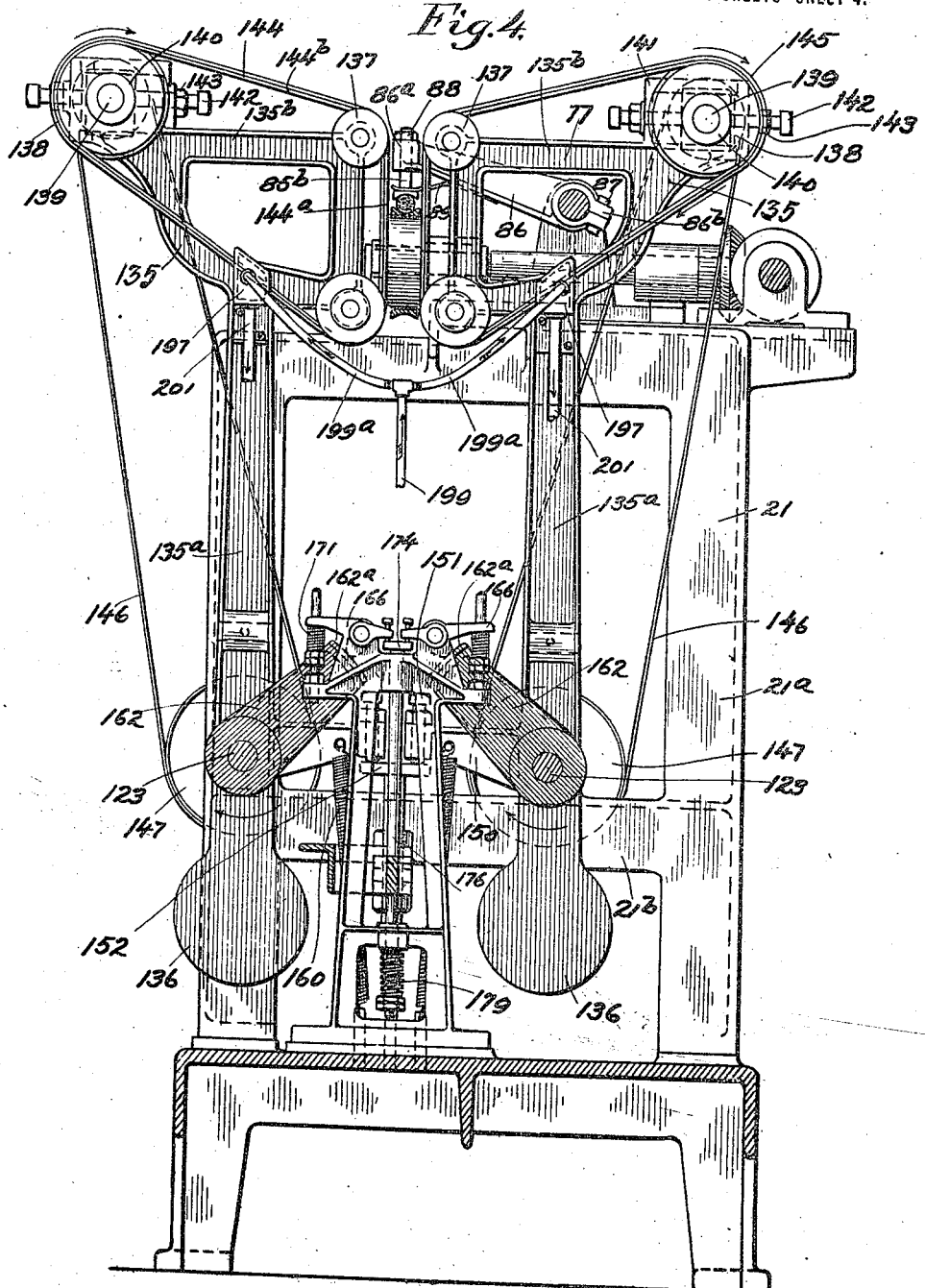

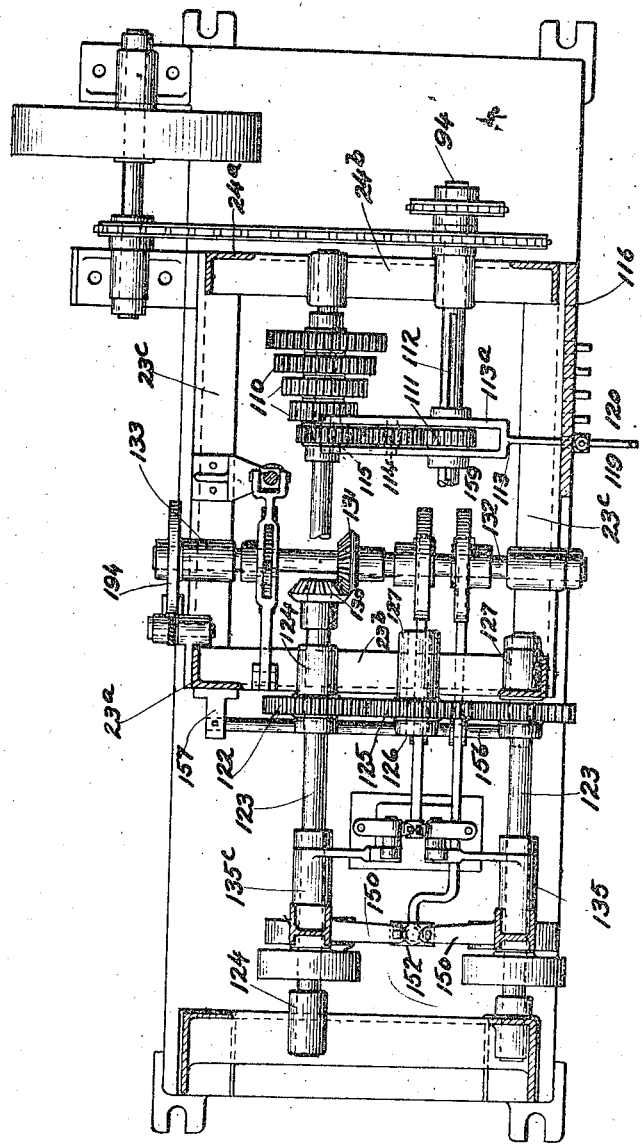

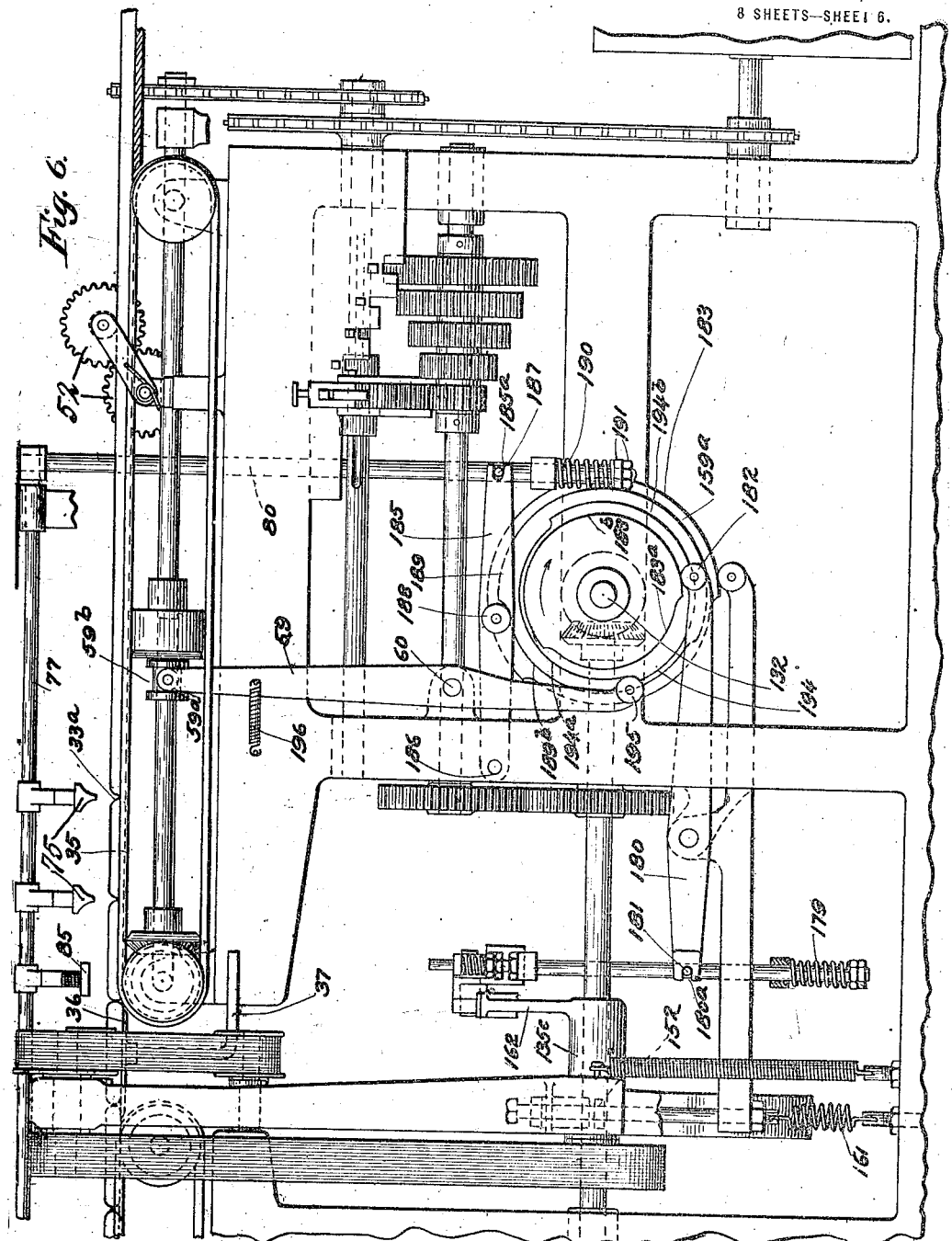

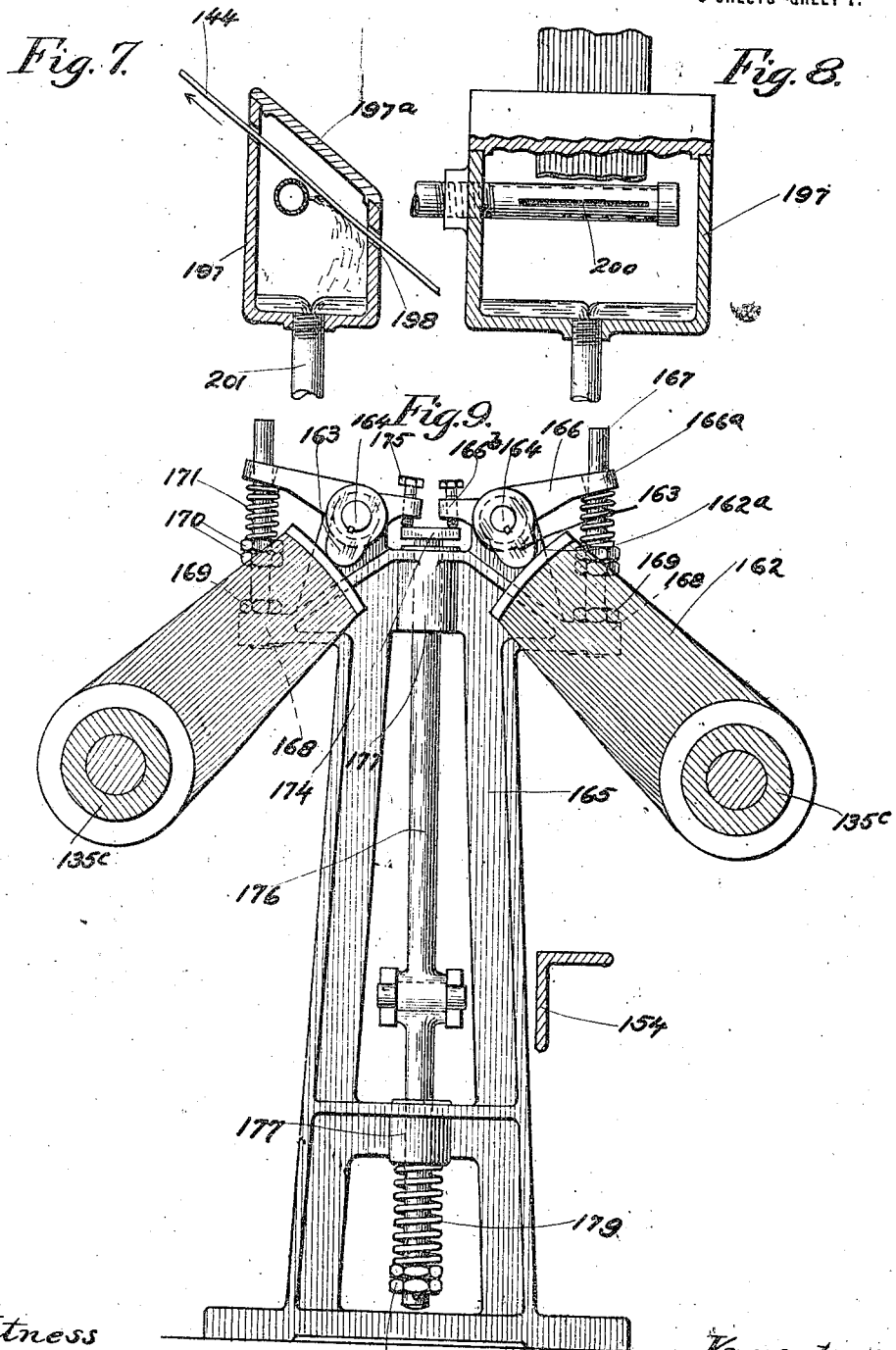

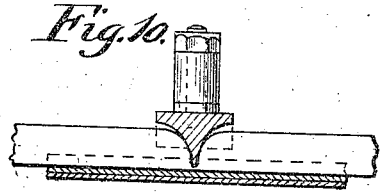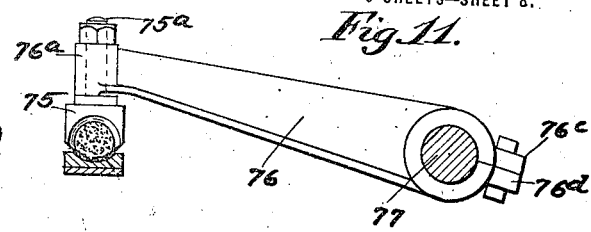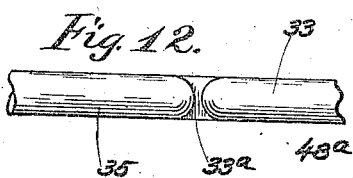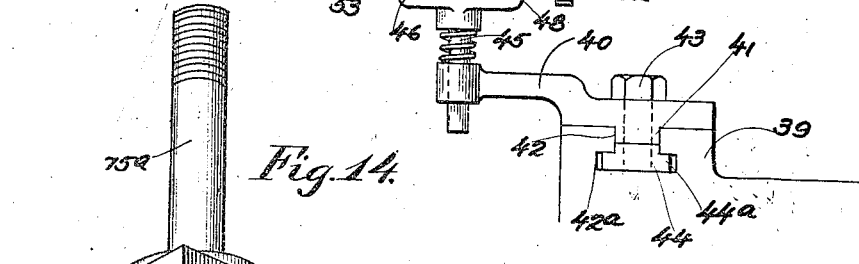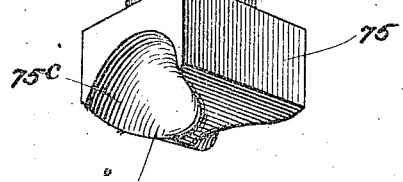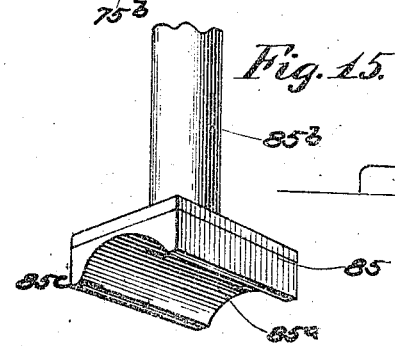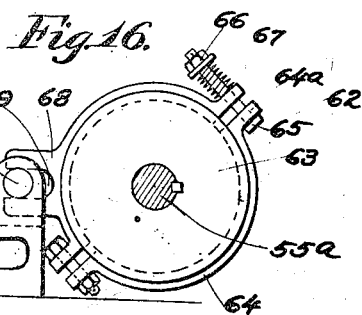

LOUIS REISFELD AND DAVID G. REICHMAN, OF CHICAGO, ILLINOIS, ASSIGNORS OF ONE-THIRD TO SAMUEL LADANYI, OF CHICAGO, ILLINOIS.

SAUSAGE-LINKING MACHINE.

1,295,208.         Specification of Letters Patent.    Patented Feb. 25, 1919.

Application filed November 25, 1916. Serial No. 133,318.

*To all whom it may concern:*

Be it known that we, LOUIS REISFELD, a subject of the King of Hungary, residing at Chicago, in the county of Cook and State of Illinois, and DAVID G. REICHMAN, a citizen of the United States, residing at Chicago, in the county of Cook and State of Illinois, have invented certain new and useful Improvements in Sausage-Linking Machines, of which the following is a specification.

This invention relates to automatic linking machines for linking sausages and the like, and its purpose is to provide improved apparatus for operating upon a stuffed sausage casing and forming the same into a series of connected and permanently separated links.

It is now the common practice in the manufacture of link sausages to form the stuffed casing into a series of permanent links by squeezing the casing at intervals with the fingers, and then manually twirling the links, in order to effect a permanent separation thereof. The mechanical apparatus which has been provided heretofore for performing this operation has usually been unsatisfactory. It is, therefore, the principal object of the present invention to provide an improved machine adapted to receive a stuffed sausage casing and form the same into a series of permanently separated links without the aid of manual manipulation of the sausage, or manual control of the machine in its operation. Another object is to provide an improved linking machine which will compress or constrict the sausage casing at intervals to form the same into links, and which will twirl or twist alternate links in order to effect a permanent separation of the links of the series.

An important object of the present invention is to provide improved means for forming a stuffed sausage casing of varying thickness into a series of links, preferably of equal length, in combination with improved means for twirling the links of varying thickness without injury to the casing of the sausage. In machines heretofore provided for this purpose, the twirling mechanism has had a fixed path of movement and has been positively actuated to engage sausages of a single size; this arrangement has been a serious disadvantage since it is desirable to use a single machine for forming link sausages of different sizes, and a single stuffed sausage casing usually varies in thickness from point to point throughout its length, so that the twirling mechanism as heretofore constructed either failed to engage the sausage to effect the twirling operation or exerted too great a pressure upon the stuffed casing, thereby breaking and tearing the same and permitting the contents to escape. These difficulties are overcome in the apparatus of the present invention by providing delicately balanced and adjusted twirling devices, which are moved automatically at proper intervals until they engage the sausage casing with sufficient pressure to effect the twirling operation, regardless of the thickness of the link to be twirled, without injuring the casing of the sausage. A further feature is the provision of resiliently mounted twirling devices adapted to engage, with the proper degree of pressure, sausage links of substantially any size and in combination with this improvement we have provided means for preventing a momentary rebound of the twirling elements away from the sausage link to be twirled immediately after the initial contact therewith.

Still another object is to provide an improved machine comprising means for feeding the stuffed sausage casing in the direction of its longitudinal axis, in combination with means for rendering the feeding means inoperative at intervals, and means for constricting the sausage casing and twirling the links during the period when the feeding means is not in operation. A further feature relates to improved means for feeding the stuffed casing through the machine so that the links will be of uniform length, and a uniform movement of the sausage will be maintained without injury to the casing. A further object is to provide a machine of the class described comprising improved means for automatically cleaning the same during its operation. Still another feature is the provision of improved means for automatically operating the feeding, compressing, and twirling means. A further feature relates to the provision of an intermittently-operating feeding means, in combination with means for compressing the stuffed sausage casing while the feeding means is at rest, means for holding the casing at each side of a link formed during a preceding operation of the compressing means, and means for twirling the last-mentioned intermediate link. A further feature is to provide improved means for varying the speed of the compressing and twirling means relatively to the speed of the feeding means. Another feature relates to the provision of improved means for performing the operations of feeding, compressing, and twirling in a continuous cycle, and means for adjusting the period of time occupied during the cycle by each of the operations performed by the machine. Other objects relate to various features of construction and arrangement, as will appear more fully hereinafter.

The various features and objects of this invention will appear more fully from the following description, taken in connection with the accompanying drawings, in which one embodiment of our invention is illustrated.

In the drawings—

Figure 1 is a side elevation of our improved automatic linking machine.

Fig. 2 is a top plan view of the same.

Fig. 3 is an end elevation, looking toward the left as viewed in Fig. 1 with certain parts removed.

Fig. 4 is a sectional view, taken on the line 4—4 of Fig. 1, showing the twirling apparatus in elevation.

Fig. 5 is a horizontal sectional view, taken on the line 5—5 of Fig. 1.

Fig. 6 is an enlarged diagrammatic side elevation of the machine, illustrating the means for controlling the operation of various parts of the apparatus.

Fig. 7 is a vertical sectional view, taken transversely of the machine through one of the chambers for cleaning a twirling belt.

Fig. 8 is a vertical section, taken longitudinally of the machine through the device shown in Fig. 7.

Fig. 9 is an enlarged detail sectional view, taken on the line 9—9 of Fig. 1.

Fig. 10 is a detail sectional view through one of the compressing elements and the adjacent feeding belt, showing the stuffed casing in elevation.

Fig. 11 is a detail sectional view, taken on the line 11—11 of Fig. 2, showing the structure of Fig. 10 in elevation.

Fig. 12 shows a top plan view of the sausage casing after the same has been compressed and before the adjacent links have been rotated relatively to each other.

Fig. 13 is a detail sectional view, taken on the line 13—13 of Fig. 2, showing the auxiliary feeding means in elevation.

Fig. 14 is an enlarged perspective view of one of the compressing or constricting elements.

Fig. 15 is an enlarged perspective view of one of the holding elements; and

Fig. 16 is a sectional view, taken on the line 16—16 of Fig. 2, showing the brake for controlling the operation of the feed shaft.

In the accompanying drawings our invention is illustrated as comprising a frame having a base 20 carried upon the legs $20^a$, which are adapted to be secured to a floor or other suitable support. Secured to the base 20, and extending upwardly therefrom at one end of the machine, is an end frame 21, having legs or side frame members $21^a$ and a cross member $21^b$, and carrying at its upper end a table 22. The base 20 also has secured thereto, and extending upwardly therefrom, two other frame members 23 and 24, comprising the upwardly extending legs or frame members $23^a$ and $24^a$, and the cross members $23^b$ and $24^b$, respectively. The legs $23^a$, $24^a$ are connected by the longitudinal side frame members $23^c$. These frame members carry at their upper ends the table 25, the upper surface of which lies in the same plane as the upper surface of the table 22. These tables are spaced apart, as shown at 26, for a purpose to be hereinafter described.

The table 25 has secured to its upper side, at the end opposite the space 26, a bearing member 27, carrying a stub shaft 28, upon which is rotatably mounted a grooved pulley 29. The table also carries two bearing members 30, at the end thereof adjacent the space 26, and these bearing members have journaled therein a shaft 31, which has secured thereto another grooved pulley 29 located in alinement with the pulley carried by the shaft 28. These pulleys have mounted thereon the endless feed belt 32, adapted to receive a stuffed sausage casing and to advance the same forwardly over the table toward the space 26. This belt comprises a leather strap $32^a$, upon which is fixed a resilient element $32^b$ having a concaved upper surface adapted to receive the stuffed sausage casing 33, and to prevent the latter from rolling off the belt. This resilient element may be formed of sections of rubber having a plurality of flexible tongues extending upwardly from the strap, or any other suitable structure may be provided for the purpose of permitting a yielding of the surface of the belt when the same is started from rest in order to provide a limited space of time in which to permit the belt to overcome the inertia of the stuffed sausage casing, which has previously been at rest, thus preventing injury to the casing of the sausage by the starting of the feeding means. The table 22 also carries a bearing member 27, in which is mounted a shaft 28, carrying a grooved pulley 29 in alinement with pulleys 29 carried by the table 25, and the table 22 also carries two bearing members 30, similar to those previously described, having rotatively mounted therein another shaft 31, on which is fixed a fourth grooved pulley 29 in alinement with those previously described. The two pulleys 29 carried by the table 22 have mounted thereon a second or supplementary feed belt 34, which is in all respects similar in construction to the belt 32 carried above the table 25. It will be seen therefore that the sausage casing will be advanced by the belt 32 to the space 26 between the tables, and then carried by the belt 34 over the table 22. The stuffed casing 33 is supported in its passage over the space 26 by means of a grooved supporting element 36 of less width than the smallest sausage to be twirled, which is carried by a bracket 37 secured to the table 25, and the upper grooved surface of this supporting element is located in alinement with the upper surfaces of the belts 32 and 34, so that the sausage casing will slide thereover in its passage from one belt to the other. The operation of twirling each alternate link of the sausage takes place while the same is supported upon the supporting element 36, as will be hereinafter described.

In order to insure a positive feed of the stuffed casing over the belts means has been provided to coact with the upper surface of the sausage as it moves over the belts, so that slipping of the sausage on the belts is prevented. One of these supplementary feeding means, designated generally by the numeral 38, is carried by each of the tables 22 and 25 to coact with the sausage casing when the same is supported by each of the belts 32 and 34, and, as these auxiliary means are similar, one only will be described. The tables are each provided with elongated bosses 39, upon which is mounted a supporting bracket 40. This bracket has a depending flange 41, adapted to slide in a groove 42 formed in the boss 39, and the bracket is apertured to be engaged by a stud 43 which engages a lock nut 44, also adapted to slide in the groove, and having laterally extending flanges 44$^a$ adapted to engage the undercut portions 42$^a$ of the groove 42, whereby the bracket and parts carried thereby are supported in position on the boss 39, and may be adjusted longitudinally thereof by releasing the stud 43, and sliding the nut 44 longitudinally in the groove 42. The bracket 40 carries an upwardly extending rod 45, having secured thereto a U-shaped bracket or bearing member 46, in which is journaled a shaft 47 having fixed thereon between the arms of the bracket 46 a drive pulley 48 having a cover 48$^a$ of cellular rubber, or the like, adapted to coact with the under surface of the belt 32. This shaft also has rotatably mounted thereon two arms 49, terminating in the hub portions 49$^a$, in which is rotatably mounted a second shaft 50, carrying a grooved roller 51, which is adapted to rest upon the sausage 33 when the latter is supported upon the belt. The two shafts 47 and 50 have fixed thereon two meshing spur gears 52, through which the roller 51 is driven by the pulley 48, thus causing a uniform frictional driving effect to be exerted upon the lower and upper surfaces of the sausage by the belt and the roller 51, respectively. This roller is maintained in contact with the sausage casing by means of a spring 53, which is secured to the bracket 46, and which engages one of the arms 49.

The feed belts 32 and 34, and the auxiliary feeding means driven thereby, are actuated through the shafts 31, having secured thereto bevel gears 54 adapted to mesh with other bevel gears 54$^a$ fixed upon the feed shaft 55. The feed shaft is in two sections, 55$^a$ and 55$^b$, which are journaled in the bearing 56 secured to the upper surface of the table 25. The portion 55$^b$ of the feed shaft is adapted to be constantly driven, by means to be hereinafter described, and it may be operatively connected to the portion 55$^a$ by means of a friction clutch 57, which consists of a socket member 57$^a$, secured to the shaft 55$^b$, and a cone 57$^b$ having a driving engagement with the shaft 55$^a$ and adapted to be moved into contact with the socket member 57$^a$. This cone is preferably formed of aluminum, or the like, so that the momentum of the moving parts will be as small as possible, and it is moved into and out of engagement with the socket member 57$^a$ by means of a lever 59, which is pivoted at 60 on a bracket 61 carried by the frame member 23. The upper end of this lever is provided with forked arms 59$^a$ adapted to engage the grooves 59$^b$ in the hub of the cone 57$^b$, and the lower end of the lever 59 is adapted to be engaged by suitable actuating means, as will be hereinafter set forth.

For the purpose of causing the shaft 55$^a$ and the parts actuated thereby to come to rest promptly after the clutch 57 has been disengaged, a brake 62 is provided, which consists of a disk 63, keyed upon the shaft 55$^a$ and engaged on its peripheral surface by the brake strap 64, which is formed in two portions having projecting lugs 64$^a$, which are apertured to be engaged by the bolts 65. Each of the bolts is engaged by a nut 66, and the uppermost bolt has mounted thereon a coil spring 67, located between the nuts 66 and the adjacent lugs 64$^a$, whereby the two portions of the brake strap are maintained in frictional engagement with the disk. One of the portions of the strap has projecting therefrom a flange 68 provided with a slot 69, which is adapted to receive a pin 70 carried by the bracket 71 secured to the upper surface of the table 25.

In order to compress or constrict the stuffed sausage casing during its passage over the table 25, we have provided a pair of compressing or constricting elements 75, comprising pins or studs 75$^a$ which extend upwardly through the enlarged extremities 76ª of the compressing arms 76. These arms are spaced apart and mounted upon a compressor shaft 77, which is adapted to rock about a horizontal axis in the bearing members 78 which are secured to the upper surfaces of the tables. The hub 76ᵇ of each of the arms 76 is split, as shown at 76ᶜ, and provided with two projecting ears 76ᵈ, which are adapted to be engaged by the clamping screw 78. By means of this screw the arms may be adjusted in their spaced relation in order to vary the length of the link sausage formed from the stuffed casing, and the arms may also be adjusted angularly on the shaft 77 in order to vary the degree of compression of the stuffed sausage casing. The shaft 77 and the compressing arms carried thereby are actuated through a crank arm 79, which is secured to one end of the shaft and pivotally connected to a rod 80, which extends downwardly through the table 25, and which is slidably mounted in a bearing 81 carried by the longitudinally-extending frame member 23ᵉ, which is secured at its end to the frame members 23 and 24. The rod 80 is actuated by means to be hereinafter described.

The compressing elements 75 are mounted above the belt 32, and are adapted to move downwardly thereover. The belt is supported beneath the compressing element by means of a supporting plate 84, which is secured to the table 25 by means of brackets 84ᵇ, and which is provided with a longitudinal groove 84ª in order to reduce frictional contact thereof with the under surface of the belt. When the rod 80 is actuated to move the compressing element 75 into engagement with the sausage casing carried upon the belt 32, the stuffed casing will be compressed between the members 75 and the belt supported by the plate 84, thus causing the sausage to be constricted at points 33ª, as shown, for instance, in Figs. 6 and 12, and forming a link sausage between the compressing elements 75, this link being separated from the remainder of the stuffed casing by the points of compression 33ª. Owing to the flexible or resilient covering provided for the belts, the stuffed casing may move relatively to the leather portion of the belt under the influence of the compressing apparatus and thus prevent injury to the casing by the compressing elements. Each of the compressing elements is preferably of the form illustrated particularly in Fig. 14, having partially spherical depressions 75ᶜ formed in the opposite faces thereof, so that the casing at the point of compression 33ª, which separates the link 35 from the body of the stuffed casing, will have substantially the form shown in Fig. 12, thus providing a greater length of the unstuffed casing at the point of compressing adjacent the outer edges of the sausage, where the twisting or rotation will be greatest when the links are subsequently twirled by means to be hereinafter described. The lower ends 75ᵇ of the compressing elements are rounded to conform substantially to the contour of the upper surface of the belt 32 so that a perfect constriction of the casing 33 will be secured.

It will be understood that after a link has been formed by the operation of the compressing or constricting means, the compressing elements are moved out of engagement with the casing, and the feeding means is then operated to move the casing and the links forwardly on the belts. During each operation of compressing or constricting the casing, the link 35, which has been formed during a preceding operation of the compressing means and which is then supported by the supporting element 36, is being twirled by the twirling means to be hereinafter described, and, in order to permit this twirling operation to be performed, it is desirable to hold in fixed position the link sausages 35 on each side of the one being twirled. For this purpose we have provided the holding elements 85, having lower grooved surfaces 85ª adapted to conform substantially to the contour of the link sausages carried by the belts, and having stems 85ᵇ adapted to be slidably mounted in the extremities 86ª of the holding arms 86, which are mounted upon the rock shaft 77 previously described, and which are adjustable thereon by means of the locking screw 87 engaging the projecting ears 86ᵇ formed on the hubs of the arms. The surfaces 85ª are preferably covered with resilient material 85ᶜ similar to the coverings of the belts 32 and 34. The upper ends of the stems of the holding elements are threadedly engaged by nuts 88, and the compressing elements are normally maintained in the positions illustrated particularly in Fig. 4 by means of leaf springs 89, which are apertured to be engaged by the stems 85ᵇ and are secured to the under surfaces of the arms. These springs 89 permit an upward movement of the holding elements with respect to the arms, thus preventing injury to the links of sausage supported on the belts. It will be seen that the arms 86 are so located on the shaft 77 that the holding elements 85 will engage two of the links which are adjacent the supporting element 36, preferably as near as possible to the link being twirled, so that the two links 35 at each side of the link being twirled are held securely in position beneath the holding elements while the twirling operation is being performed.

Having explained the construction of the means for effecting the feeding, compressing, and holding operations, we will now describe the apparatus by which the feeding, holding, and twirling means are operated. One end of the portion 55$^b$ of the feed shaft 55 projects beyond the end of the table 25 and has secured thereon a sprocket wheel 91 which is connected by a sprocket chain 92 to another sprocket wheel 93, which is fixed upon the drive shaft 94. This drive shaft is journaled in the bearings 95 carried by the frame members 23 and 24 and is maintained in fixed position longitudinally by means of collars 96. A large sprocket wheel 97 is also fixed on the shaft 94 adjacent the wheel 93, and is connected by means of a sprocket chain 98 to a driving sprocket wheel 99 fixed on the power shaft 100. The power shaft is journaled in the bearings 101 and 102, which are carried by the frame member 24 and the bracket 103, respectively, the latter being fixed upon the base 20 at the right of the frame member 24, as viewed in Fig. 1. This power shaft 100 has keyed, or otherwise secured thereon, a driving pulley 105, which is adapted to be connected by a belt to an electric motor, or other source of power, not shown. It will be apparent that the driving shaft 94 and the portion 55$^b$ of the feed shaft will be operated continuously when the pulley 105 is driven by the source of power connected thereto. The compressing and holding apparatus and the twirling apparatus are driven intermittently from the power shaft 94 by the mechanism now to be described.

In order to permit a variation in the speed of operation of the holding, compressing and twirling apparatus independently of the speed of operation of the feeding apparatus, we have provided an intermediate shaft 106, which is operatively connected to the driving shaft 94 by suitable change speed mechanism. This intermediate shaft 106 is journaled in bearings 107 carried by the frame members 23 and 24 and is secured against longitudinal movement in its bearings by means of the collars 108 which are fixed thereon by pins, or the like. A plurality of spur gears 110 are fixed on the shaft 106 between the frame members 23 and 24, these gears being of different sizes and number of teeth. The shaft 94 is adapted to be connected to any one of the spur gears 110 by means of gear-shifting mechanism, which comprises a pinion 111, having a driving engagement with the shaft 94 by means of a key adapted to slide in the keyway 112 formed in the shaft. This pinion 111 is mounted between the two arms 113$^a$ of a gear-shifting lever 113, which is rotatably mounted on the shaft 94 and which has journaled therein the two meshing pinions 114 and 115. These pinions 114 and 115 are arranged to mesh with the pinion 111 and with one of the spur gears 110, respectively, and by oscillating the lever 113 about the shaft 94, the pinion 115 can be moved out of engagement with any one of the spur gears 110, after which the lever 113 may be moved longitudinally of the shaft 94 and then adjusted to bring the pinion 115 into mesh with the desired one of the spur gears 110. The gear-shifting lever 113 may be located in any desired position by means of a plate 116, which is secured to the table 25 and frame member 24 and which is provided with a plurality of notches 117, each adapted to receive the handle of the lever 113 when the same is in a position wherein the pinion 115 meshes with one of the spur gears 110. The plate 116 is further provided with a plurality of outwardly projecting lugs 118, one of which is located above each one of the notches 117, and the lever 113 carries a pivoted latch 119, which may be swung upwardly over one of the lugs 118 and maintained in position with respect to the same by means of a thumb screw 120. After releasing the thumb screw, the latch may be swung outwardly and the gear shifting mechanism then adjusted in the manner above described.

The intermediate shaft 106 has fixed on the end thereof, adjacent the frame member 23, a pinion 121 which meshes with a gear 122 fixed on one of the twirling arm shafts 123 which are journaled in bearings 124 carried by the frame members 21 and 23. Two of the shafts 123 are provided, and the gears 122 fixed thereon are connected through an idler gear 125 which is fixed upon a stub shaft 126 journaled in a bearing 127 carried by the frame member 23 between the two shafts 123. By means of this construction, the two shafts 123 which actuate the twirling mechanism are caused to rotate in the same direction. The shaft 123, which carries the first-mentioned gear 122, has a bevel gear 130 fixed on the projecting end thereof and arranged to mesh with another bevel gear 131 secured to the cam shaft 132 which extends transversely of the machine and is journaled in bearings 133 carried by a side frame member 23$^c$. This cam shaft is arranged to actuate the holding, compressing and twirling mechanism, and to control the feeding mechanism, as will be hereinafter described.

The two shafts 123 have pivotally mounted thereon two twirling belt brackets, or frames 135, of the form shown particularly in Fig. 4, these frames being arranged to extend upwardly into the space 26 between the tables 22 and 25. Each of the frames 135 carries a counterweight 136 located below the corresponding shaft 123, and each frame comprises an arm 135$^a$ extending upwardly from the shaft and carrying the bracket-portion 135$^b$ at the upper end thereof. The parts 135$^a$ and 135$^b$ of each frame are preferably formed of aluminum in order to decrease the weight, to reduce the friction between the frames and shafts 123 and thereby the tendency of the frames to rotate with the shafts, and to permit the frames to be readily maintained in balanced positions by the counterweights 136. Each frame 135 has rotatably mounted thereon two flanged pulleys 137 mounted in a vertical plane, and a third flanged driving pulley 138 rotatably mounted on a shaft 139 carried by an adjustable bearing block 140, which is seated in a suitable socket member 141 carried by the bracket-portion 135$^b$, and which is adjustable in said socket member by means of set screws 142 and lock nuts 143. Each set of pulleys 137, 138 has mounted thereon one of the twirling belts 144 which belts are driven in the same direction by means of the driving pulley 145 fixed on each of the shafts 139, so that the vertically disposed portions 144$^a$ of these belts move in opposite directions on opposite sides of the supporting element 36, which carries the link of sausage 35 when the same is being twirled. The belts 144 are covered on their outer sides with resilient coverings 144$^b$. Each of the pulleys 145 is connected by means of a belt 146 to a pulley 147 which is fixed upon one of the twirling belt shafts 123. Inasmuch as the shafts 123 rotate in the same direction, as indicated by the arrows in Fig. 4, for instance, it will be seen that the belts 144 will be actuated in the same direction as indicated by the arrows in Fig. 4.

Each of the frames 135 also comprises a hub portion 135$^c$, by means of which the frame is pivotally mounted on the corresponding shaft 123, and these hub portions 135$^c$ have secured thereto, or formed integrally therewith, the actuating levers or arms 150, the inner ends of which carry vertically extending adjusting screws 151 which are adapted to bear at their lower ends upon a block or plate 152 carried by a bolt 153, which extends downwardly through the end 154$^a$ of an actuating lever 154, and is secured in position with respect to the same by means of the nuts 155. This lever 154 is pivotally mounted on a shaft 156 carried by the brackets 157 which project from the middle frame member 23. The end of the lever 154, opposite the plate 152, is provided with a roller 158, which is adapted to bear upon a cam 159 fixed on the cam shaft 132, previously described. The two actuating arms 150 have connected thereto the coil springs 160 which are attached at their other ends to the base 20, so that these springs normally tend to move the frames to positions wherein the twirling belts 144 will engage a link sausage of the smallest size for which the machine is designed. The lower end of the bolt 153 has connected thereto a coil spring 161 which is attached at its other end to the base 20. This spring serves to maintain the roller 158 in contact with the cam 159 as shown more clearly in the diagrammatic view illustrated in Fig. 6. During a part of the revolution of the cam 159, the lever 154 will remain stationary while the roller 158 is in contact with the portion 159$^a$ of the cam of larger radius. When in this position the plate 152 will be elevated so that the frames 135 will be rocked away from the supporting element 36 upon which the link sausage is supported during the twirling operation, but when the cam shaft 132 is rotated to a position wherein the roller 158 contacts with the portion 159$^b$ of the cam of smaller radius, the spring 161 will force the plate 152 downwardly and thus cause the frames 135 to move toward each other until the twirling belts engage the opposite sides of the link 35 supported on the element 36, thereby causing that link to be rotated with respect to the two links held by the holding elements 85 on each side thereof.

The hub portion 135$^c$ of the twirling frames also have secured thereto, or formed integrally therewith, the arresting arms 162 provided on their end portions with arcuated portions 162$^a$ adapted to co-act with the arresting cams 163. These cams 163 are fixed on shafts 164 rotatably mounted in the upper part of a sub-frame 165, which is secured to the base 20 of the machine. These cams are actuated to move into and out of operative positions with respect to the arresting arms 162 by means of the levers 166, each of which has one end 166$^a$ apertured to be loosely engaged by a pin 167 extending upwardly from a lug 168 projecting laterally from the sub-frame 165. Each of these pins 167 is located in adjusted position with respect to the lug 168 by means of a nut 169, and each pin is further provided with two lock nuts 170 which serve as a support for a coil spring 171 mounted on the pin and arranged to engage at its upper end the extremity of the lever 166, whereby the spring 171 normally tends to rock the shaft 164 and cause the arresting cam 163 to pass into engagement with the corresponding arresting arm 162. The arresting cams are moved out of engagement with the arresting arms by means of a plate 174 which is engaged on its upper side by the two adjusting screws 175 which threadedly engage the extremities 166$^b$ of the levers 166. This plate 174 is carried by a rod 176, which is slidable in bearings 177 carried by the sub-frame 165. The lower end of the rod 176 carries two lock nuts 178, and a coil spring 179 is mounted on the rod 176 between these lock nuts and the lower bearing 177, so that the rod 176 is normally maintained in its lowermost position by the action of the spring.

The rod 176 is adapted to be moved in a direction to rotate the arresting cams 163 away from the arresting arms 162 by a lever 180, which is pivoted on the shaft 156, previously described, and which is provided with a slot 180ª adapted to have a pivotal and sliding engagement with a pin 181 carried by the rod 176. This lever is provided with a roller 182 at the end thereof opposite the rod, and this roller is adapted to bear on the peripheral surface of an actuating cam 183, which is keyed or otherwise secured upon the cam shaft 132, previously described. It will be seen that the coil spring 179 normally maintains the roller in contact with the cam 183, so that as the cam rotates, the rod 176 will be actuated to control the movement of the arresting cams into and out of engagement with the arresting arms 162. When the roller is in contact with the portion 183ª of the cam of smaller radius, the rod 176 will be in its lowermost position, thereby permitting the levers 166 to be actuated by the springs 171, so that the arresting cams will be moved into engagement with the arcuate surfaces 162ª of the arresting arms, and thus resist the movement of these arresting arms away from each other about the shafts 123, upon which they are mounted. When the roller 182 passes into engagement with the portion 183ᵇ of the cam having the larger radius, the rod 176 and plate 174 are moved upwardly, thereby rotating the arresting cams out of engagement with the arresting arms, so that said arms and the twirling frames will be permitted to move freely away from each other.

The rod 80, previously described, which controls the operation of the holding and compressing elements, is actuated by a lever 185, which is pivoted at 186 on the intermediate frame member 23, and which is provided at its other end with a slot 185ª, adapted to be pivotally engaged by the pin 187 carried by the rod 80. The lever 185 carries a roller 188 at an intermediate point, and this roller is adapted to bear upon the peripheral surface of a cam 189, fixed on the cam shaft 132, the roller being maintained in contact with the surface of the cam by a coil spring 190 mounted on the lower end of the rod 80 between the bearing 81 and the lock nuts 191, which are fixed on said rod. This cam is provided with two portions 189ª and 189ᵇ, of smaller and larger radius, respectively, so that at a predetermined point in the rotation of the cam shaft the rod will be moved upwardly against the compression of the spring, and thereby rotate the shaft 77, thus causing the squeezing elements 75 and compressing elements 85 to be moved into engagement with the stuffed casing 33 carried by the feeding belt 32.

The clutch 57, by means of which the operation of the feeding mechanism is controlled, is actuated through the lever 59, previously described, by means of a cam 194, fixed on the cam shaft 132, and adapted to be engaged on its peripheral surface by a roller 195 pivotally mounted on the lower end of the lever. This roller is normally maintained in contact with the cam by a spring 196, which is connected to the frame 23 and to the upper part of the lever. The cam 194 is provided with two portions 194ª and 194ᵇ having different radii, so that at predetermined points in the rotation of the cam shaft 132 the lever 59 will be actuated to move the clutch member 57ᵇ into and out of engagement with the clutch member 57ª, thus causing the feeding operation to take place intermittently.

In order to maintain the twirling belts 144 in a clean and sanitary condition, means has been provided for continuously cleaning these belts during the operation thereof, this cleaning means comprising two casings 197, which are mounted upon the portion 135ᵇ of the twirling frames, as shown in Fig. 4. These casings are preferably of the form shown particularly in Figs. 7 and 8, each having a detachable cover 197ª and being provided with relatively narrow slots 198 in opposite faces thereof, and in proper positions to receive a belt 144 as the latter travels upon the pulleys 137 and 138. A flexible liquid supply tube 199, leading from a suitable source of water supply, or the like, is provided with two branches 199ª, which communicate with the casings 197 and are provided with longitudinal slots or apertures 200 disposed on the under sides of the belts 144, and located so that the thin jets of water projected through these slots or apertures will impinge upon the lower surfaces of the belt in a direction opposite to the direction of travel of the belts, thus effecting a thorough and continuous cleaning thereof. The waste water passing off the belts is drained away through tubes 201.

In the operation of this improved apparatus the stuffed sausage casing is fed or placed upon the feeding belt 32, with the end thereof beneath the roller 51 of the auxiliary feeding apparatus 38, carried by the table 25; but prior to beginning the operation this auxiliary feeding apparatus is adjusted longitudinally of the table 25 by means of the bolt 43 and nut 44, so that the roller 51 is located a distance from the vertical plane of the first compressing arm 76 equal to twice the length of the sausage links which are to be formed by the apparatus, so that if the machine be set in operation with the extremity of the casing beneath the first roller 51, at the instant when the clutch members 57ª and 57ᵇ are operatively engaged, the casing will be fed forwardly on the belt 32 a distance equal to the length of two sausage links before the clutch members are disengaged by the operation of the cam 194. After one operation of the feeding mechanism the extremity of the casing will be brought to a position beneath the first compressing element 75, and after two operations the casing will be brought to a position wherein the extremity is located beneath the first holding element 85. At the end of each feeding operation the clutch members will be disengaged and the brake 62 will cause the feeding belts to come to rest promptly, after which the cam 189 actuates the rod 80, rotates the shaft 77, and passes the compressing or squeezing elements into engagement with the sausage casing, thereby compressing the same at the points 33ª and forming an intermediate sausage link 35. After the second feeding operation the first holding element 85 will engage the extremity of the casing. After the squeezing operation has been performed by the squeezing elements, and while the same are still in compressing position, the twirling frames 135 will be moved inwardly, but at this stage there is no link in position to be twirled on the supporting element 36, and this operation of the twirling belts after the first and second feeding operations is therefore an idle operation. At some suitable point in the operation, preferably after the twirling belts have moved out of twirling position, the cam 189 will again actuate the rod 80 to elevate the compressing elements 75 and holding elements 85.

When the sausage casing has been completely released by the compressing and holding elements, the cam 194 will again be actuated to engage the clutch members and cause the feeding belts to be actuated. The stuffed casing and the links formed therefrom will then be advanced along the belt 32 a distance equal to the length of two sausage links, so that the link 35, formed during the preceding operation of the compressing elements, will then occupy a position on the supporting element 36 above the space 26 between the two tables. When this feeding operation has been completed and the clutch member disengaged by the cam 194, the shaft 77 will again be actuated by means of the cam 189, thereby causing the compressing element 75 to engage the stuffed casing again and form a new link, while at the same time the resiliently mounted holding elements 85 will engage the ends of the two links on opposite sides of the supporting element 36. Preferably after the holding elements have fully reached their holding positions, the cam 159 will actuate the lever 154 in such a manner as to permit the twirling frames 135 to move inwardly toward each other under the influence of the coil springs 160. The twirling frames are so balanced that the portions 144ª of the twirling belts will engage the lateral edges of the links 35 and the resilient coverings 144ᵇ of the twirling belts will cause them to grip the link and overcome its inertia, without injuring the casing. An instantaneous rebound of the twirling belts and frames away from the link after the initial contact therewith is prevented by the arresting cams 163, which are moved into engagement with the arresting arms 162 by the operation of the cam 183 during or just prior to the movement of the twirling frames inwardly toward each other. At the instant after the twirling belts initially engage the opposite sides of the link, these arresting cams bearing on the arcuate surfaces 162ª will prevent a momentary movement of the belts away from the casing, owing to the resistance which these cams oppose to the movement of the arms away from each other, as will be apparent from an inspection of Fig. 9. The twirling belts, being thus resiliently maintained in contact with the link 35 after the initial engagement therewith, will rotate the same about its longitudinal axis. When this twirling operation has been carried out to the extent desired, the cam 159 will actuate the lever 154 and move the twirling belts out of contact with the link 35; but prior to this operation of the cam 159 and just before the completion of the twirling operation, the cam 183 will actuate the rod 176 and move the arresting cams 163 out of engagement with the arresting arms 162, so that the oppositely disposed twirling frames will be permitted to move freely away from each other. When the twirling belts have passed completely out of engagement with the link 35 which has been twirled, or during the latter portion of this movement of the twirling belts, the cam 189 will actuate the rod 80 and the shaft 77 to move the compressing elements 75 and holding elements 85 out of engagement with the stuffed casing and the links formed therefrom. After the last-mentioned operation has been performed by the cam 189, the cam 194 will again actuate the clutch members and cause the feeding mechanism to operate, so that the stuffed sausage casing and the links will be advanced longitudinally by the belts 32 and 34 and the auxiliary feeding devices 38. In this way the cycle of operations is repeated continuously, and each alternate link is twirled to form a permanent separation between it and the other links, without the necessity of manual operation or attention. If desired, the completed links may be removed from the belt 34 to a suitable smoking device, or other means for treating the sausages.

When the operator desires to vary the length of the link sausages formed by the apparatus, the compressing arms 76 may be adjusted in their spaced relation on the shaft 77, and they may also be adjusted in their angular position in order to operate upon stuffed casings of different size or thickness; the holding arms carrying the holding elements 85 may also be adjusted angularly and longitudinally on the shaft 77 in order to operate properly upon links of varying size at each side of the link being twirled. Having varied the compressing and holding arms in their positions on the shaft 77, the speed of operation of the compressing, holding, twirling, and arresting means may be varied to correspond to the different sizes of links formed, by manipulating the lever 113 in order to cause the pinion 115 to engage any desired one of the spur gears 110 which are mounted on the shaft 106. It will be seen that the number of different lengths of link sausages which may be formed by the apparatus will correspond to the number of spur gears 110 which are mounted on the shaft 106. By means of this adjustment, the holding, compressing, and twirling means may be timed to operate properly for various sizes of links formed from the stuffed sausage casing. By varying the angular position of the various cams used, or the construction of the cams, other adjustments in the operation may be made. It will be understood that, unless the speed of the power shaft 100 be altered, the linear speed of the feeding belts 32 and 34 will be the same regardless of the length of the link sausages being formed by the apparatus, but it will also be apparent that the clutch by which the feeding mechanism is controlled is operated from the cam shaft 132, the speed of which varies according to the speed of the intermediate shaft 106 and according to the speed of operation of the holding, compressing, and twirling devices. In this way the frequency of the operations of the clutch 57 bears the same relative proportion to the frequency of the operations of the compressing, holding, and twirling devices regardless of the length of the links being formed, although the speed of operation of the holding, compressing, and twirling devices will vary as compared with the linear speed of the feeding belts. By reason of this novel relation of the different parts of the apparatus, it will be found that the feeding mechanism will be operated by the clutch to start and stop the movement of the stuffed casing at the proper intervals corresponding to the intermittent action of the holding, compressing, and twirling devices, regardless of the length of the links being formed, since the frequency of operation of the clutch and of the holding, compressing, twirling, and arresting devices will increase proportionally as the length of the links is decreased.

The filled sausage casing is always advanced forwardly on the feeding belts with the same velocity, but the duration of the feeding operation and the length of the sausage links to be formed is determined by a cam, which actuates a clutch to engage and disengage the feeding means at the proper intervals of time. The constricting, holding, and twirling means are also actuated by cams mounted on the same shaft with the feeding cam and these cams have permanent proportions which insure a permanent relation between the feeding, constricting, holding, and twirling operations within one cycle of operations, but, the cam shaft being driven by means, the speed of which may be varied, it is possible to change the number of cycles per unit of time and to effect a corresponding change in the length of the sausage links. For example, if the feeder belts be actuated with a constant velocity of 960 inches per minute and the feeder cam be of such shape that during fifty per cent. of its revolution, it will keep the clutch 57 engaged, and it be assumed that the cam actuating the twirling frames be such as to keep the twirling belts engaged with the links during thirty per cent. of a revolution of the cam shaft, if twenty per cent. of a revolution of the cam shaft be taken up by the operations of the cam levers and the movement of the arresting means; and if it be further assumed that the cam shaft makes 96 revolutions per minuate and that the gearing and pulleys are of such proportions as to give the twirling belts a corresponding linear velocity of 1508 inches per minute, the result will be that the clutch 57 is engaged during half of each revolution of the cam shaft, or for a period of 1/192 of a minute; the feeder belts having a velocity of 960 inches per minute will then feed the stuffed casing a distance equal to 960 divided by 192, or five inches, which will be equal to twice the length of the sausage links as above explained, the constricting means being then 2½ inches apart; when the feeder belts stop, the twirling frames come into action and will keep the twirling belts in contact with the link to be twirled during thirty per cent. of a revolution of the cam shaft, and since these belts are moving with a linear speed of 1508 inches per minute, they will remain in contact with the link while they pass through a distance equal to 1/96×.30×1508 or 4.71 inches, so that if the link has a diameter of three-fourth's of an inch, it will make 4.71 divided by .75π, or two revolutions, that is, the link will be twisted twice around. If the link is of a smaller diameter, the belts will be in contact with it for a shorter time, but since the circumference is also smaller, the period of contact and the number of the twisting of the links will remain the same; and this is also true if the links be larger in diameter. If it now be assumed that the number of revolutions of the cam shaft be reduced from 96 to 48, the feeder belt will feed, during every turn of the feeder cam, a length of stuffed casing equal to 1/48× .5×960, or 10 inches, corresponding to two links of sausage with the constricting arm set five inches apart. Since the relation of the gearing of the twirling belts is constant, and the cam from which the movement of the belts is derived will now make half as many revolutions as before, the linear velocity of the twirling belts will be half of what it was before, or 754 inches per minute. The twirling belts are kept in contact with the link thirty per cent. of the revolution of the cam shaft and consequently the period of contact with the link will be 1/48×.30× 754, or 4.71 inches, the same as before. The links will therefore be twisted twice around no matter what the angular velocity of the cam shaft is, so that by varying the speed of the cam shaft and thereby varying the number of cycles of the machine per unit of time, we are able to change the length and the number of sausage links formed per unit of time. The larger the link is, the slower it will be twirled, which is a desirable condition as it insures a simultaneous turning of both ends of the link together with that portion of it which is immediately acted upon by the twirling belts.

An important feature of the invention is the provision of elastic coverings, or outer coatings, for the twirling belts as well as for the feeding members which engage the sausage casing. If the belts were not provided with this elastic covering, it would be necessary for them to penetrate the stuffed casing to a certain depth to insure sufficient friction to overcome the inertia of the stuffed casing, and while penetrating the link to this depth, the belts running continuously would wear out the casing at the surface of contact, and if the belts were suddenly brought into contact with the link, the impact would tear away the casing before the link started rotating. Our improved resilient coating for the belts serves to provide a gradual acceleration of the link although allowing the belts to approach it with considerable speed. The elastic covering will be retarded relatively to the latter operation of the belt from the instant of contact of the belt with the stuffed casing until the inertia of the link is overcome, thus greatly reducing the amount of sliding friction on the casing, and with it the danger of its being torn open.

Owing to the novel construction and arrangement of the twirling devices, these devices will operate perfectly upon sausage links of substantially any thickness within the range of thicknesses for which the machine is designed, thus taking account of the varying thickness of a stuffed sausage link at various points throughout its length, and making it possible to use a single machine for forming sausage links of different thickness and of different lengths as above explained. Since the inertia of the twirling devices is relatively small, and since they are sensitively adjusted to be actuated by the coil springs 160, it will be seen that when the twirling frames are released by the operation of the cam 159, these springs will move the twirling frames inwardly until the twirling belts engage the sausage link on the element 36 in position to be twirled. These springs are formed of the proper strength to move the twirling frames inwardly until the twirling belts will engage, with the proper pressure for the twirling operation, a link of the smallest thickness or diameter for which the machine is designed, so that the belts will engage sausages of somewhat larger diameter with a pressure adapted to effect the twirling operation but not so strong as to cause an indentation of the links or injury to the casings thereof. The tendency of the frames to move away from the link immediately after the initial contact therewith under the influence of the springs 160, is overcome by means of the automatically actuated arresting mechanism previously described. The operation of the twirling mechanism may be adjusted independently by means of the adjusting screws 151 passing through the arms 150, by which the twirling frames are actuated, and the twirling belts may be maintained in a taut condition by adjusting the screws 142. The operation of the arresting mechanism may also be adjusted independently by means of the screws 175 passing through the levers 166 which actuate the arresting cams. Owing to the novel construction and wide adjustability of the various parts of this apparatus, it may be caused to operate perfectly upon stuffed sausage casings of widely different sizes and of irregular cross sections. A particular advantage of the mechanism is that it is automatically maintained in a clean and sanitary condition even when in continuous use, and a further important feature is the fact that the twirling apparatus operates upon links of substantially any size and of irregular cross section without causing injury to the casing of the sausage.

Although we have shown and described a particular embodiment of our invention for purposes of illustration, it will be understood that it may be constructed in widely different forms without departing from the spirit of our invention as defined in the appended claims.

What we claim is:

1. In apparatus of the class described, means for constricting a filled sausage casing and forming the same into links, and twirling means operated while said constricting means is engaging said casing for twirling a link formed by a preceding operation of said constricting means.

2. In apparatus of the class described, means for forming a filled sausage casing into a series of connected links, and twirling means for operating upon said links, said twirling means operating automatically to engage with substantially equal pressure links of widely different sizes.

3. In apparatus of the class described, means for forming a filled sausage casing into a series of connected links, twirling elements adapted to engage said links from opposite sides thereof, supporting means for each of said twirling elements, and resilient means for moving each of said supporting means to cause said twirling elements to engage links of different size with substantially equal pressure.

4. In apparatus of the class described, means for forming a filled sausage casing into a series of connected links, resiliently mounted twirling means movable into engagement with said links, and means for preventing a movement of said twirling means away from said links immediately after engagement therewith.

5. In apparatus of the class described, means for forming a filled sausage casing into a series of connected links, means for moving said links longitudinally, twirling elements mounted on opposite sides of the path of said links, means for moving said twirling elements automatically into engagement with said links to engage links of different size with substantially equal pressure, and means for operating said twirling elements.

6. In apparatus of the class described, means for forming a filled sausage casing into a series of connected links, resiliently mounted twirling means movable into engagement with said links, and cam actuated arresting means for opposing the movement of said twirling means away from said links immediately after engagement therewith.

7. In apparatus of the class described, means for feeding a filled sausage casing in the direction of its longitudinal axis, means for compressing said filled casing at intervals, and means for effecting a relative rotation thereafter of the parts of said filled casing at each side of each point of compression, said rotating means being operated after said compressing means has released said casing.

8. In apparatus of the class described, feeding means for advancing a filled sausage casing in the direction of its longitudinal axis, compressing means arranged to engage said filled casing at spaced intervals to form the same into links, means independent of said compressing means for holding alternate links, and means for twirling the link between those being held.

9. In apparatus of the class described, feeding means for advancing a filled sausage casing in the direction of its longitudinal axis, compressing means arranged to engage said filled casing at spaced intervals to form the same into links, means separate from said compressing means for holding alternate links, means for twirling the link between those being held, means for operating said feeding means intermittently, and means for operating said compressing, holding, and twirling means intermittently in alternation with the operation of said feeding means.

10. In apparatus of the class described, means for feeding a filled sausage casing in the direction of its longitudinal axis, means for compressing said filled casing at spaced intervals to form the same into links, means for twirling alternate links, and means for controlling the speed of operation of said compressing and twirling means independently of said feeding means.

11. In apparatus of the class described, means for advancing a compressible article in the direction of its longitudinal axis, constricting means for engaging said article at two points spaced apart for forming a link, means for operating said first-named means after said constricting means has operated, and means operated while said first-named means is at rest for twirling a link formed during a preceding operation of said constricting means.

12. In apparatus of the class described, means for forming a compressible article into a series of connected links, twirling means for effecting a relative rotation of adjacent links about a longitudinal axis, means for moving said twirling means into engagement with said article, the operation of said last named means being automatically adjusted by the thickness of said article, and arresting means for preventing a return movement of said twirling means immediately after it engages said article.

13. In apparatus of the class described, means for forming a compressible article into a series of connected links, twirling means for effecting a relative rotation of adjacent links about a longitudinal axis, means for moving said twirling means into engagement with said article, the inward movement of said twirling means being automatically adjusted by the size of said article, arresting means for preventing a return movement of said twirling means immediately after it engages said article, means for moving said twirling means out of contact with said article, and means for rendering said arresting means inoperative when said last-named means is operated.

14. In apparatus of the class described, means for forming a filled sausage casing into a series of connected links, twirling means for effecting a relative rotation of adjacent links about a longitudinal axis, cam actuated means for operating said first-named means, cam actuated means for operating said twirling means, and means for varying the frequency of the operations effected by each of said cam actuated means.

15. In apparatus of the class described, means for forming a filled sausage casing into a series of connected links, means for holding alternate links in a stationary position, oppositely disposed resiliently actuated twirling means arranged to engage an intermediate link for rotating the same, and means to move said twirling means into and out of engagement with said intermediate link.

16. In apparatus of the class described, means for forming a filled sausage casing into a series of connected links, means separate from said first-named means for holding alternate links in a stationary position, oppositely disposed twirling means arranged to engage an intermediate link for rotating the same, means to move said twirling means into and out of engagement with said intermediate link, and means for advancing said links when said twirling means and said holding means are not in operation.

17. In apparatus of the class described, means for forming a compressible article into a series of connected links, oppositely disposed twirling elements arranged to engage opposite sides of one of said links, means for moving said twirling elements in opposite directions, and means for moving said twirling elements into and out of engagement with said link, the movement of said twirling elements toward said link being automatically adjusted by the size of said link.

18. In apparatus of the class described, means for forming a filled sausage casing into a series of connected links, oppositely disposed twirling elements arranged to engage opposite sides of one of said links, means for moving said twirling elements in opposite directions, means for moving said twirling elements into and out of engagement with said link, and means movable with said elements for washing said twirling elements.

19. In apparatus of the class described, means for forming a filled sausage casing into a series of connected links, oppositely disposed twirling elements arranged to engage opposite sides of one of said links, means for moving said twirling elements in opposite directions, means for moving said twirling elements into and out of engagement with said link, arresting means for controlling the movement of said twirling elements toward and away from said link, and means for automatically actuating said arresting means.

20. In apparatus of the class described, feeding means for advancing a filled sausage casing in the direction of its longitudinal axis, means for intermittently actuating said feeding means, means actuated when said feeding means is not in operation for compressing said filled casing at spaced intervals to form an intermediate link, means for holding said filled casing on opposite sides of an intermediate link formed by a preceding operation of said compressing means and means for twirling said link formed by a preceding operation of said compressing means, said feeding means being rendered operative after said twirling operation has been completed.

21. In apparatus of the class described, means for feeding a filled sausage casing in the direction of its longitudinal axis, compressing elements for engaging said casing to constrict the same, means for intermittently operating said constricting means in alternation with the operation of said feeding means, means for varying the spaced relation of said compressing elements, and twirling means operating while said compressing elements are in operation for twirling a link formed by a preceding operation of said compressing elements.

22. In apparatus of the class described, a movable member for supporting and advancing a filled sausage casing, said member having a flexible part in contact with said casing, and means movable into contact with said casing for constricting the same by compressing it against said member.

23. In apparatus of the class described, a pair of pulleys, a belt mounted on said pulleys to move in horizontal planes therebetween, said belt comprising a resilient part adapted to engage and support a filled sausage casing, and means for actuating one of said pulleys.

24. In apparatus of the class described, a pair of pulleys, a belt mounted on said pulleys to move in substantially horizontal planes therebetween, means for actuating one of said pulleys, said belt being arranged to support and feed a filled sausage casing, and auxiliary feeding means actuated by said belt and arranged to engage the upper side of said filling casing.

25. In apparatus of the class described, a pair of pulleys, a belt mounted on said pulleys to move in substantially horizontal planes therebetween, means for actuating one of said pulleys, said belt being arranged to support and feed a filled sausage casing, and auxiliary means actuated by said belt and arranged to engage the upper side of said filled casing, said auxiliary means having a resilient part in contact with said casing.

26. In apparatus of the class described, a pair of pulleys, a belt mounted on said pulleys to move in substantially horizontal planes therebetween for feeding a filled sausage casing supported thereon, means for actuating said belt, a clutch for controlling said last named means, and means for automatically operating said clutch.

27. In apparatus of the class described, a pair of pulleys, a belt mounted on said pulleys to move in substantially horizontal planes therebetween for feeding a filled sausage casing supported thereon, means for actuating said belt, a clutch for controlling said last named means, and cam actuated means for operating said clutch.

28. In apparatus of the class described, a pair of pulleys, a belt mounted on said pulleys to move in horizontal planes therebetween, means for actuating one of said pulleys, said belt being arranged to support and feed a filled sausage casing, auxiliary means actuated by said belt and arranged to engage the upper side of said filled casing, and means for varying the position of said auxiliary feeding means.

29. In apparatus of the class described, a pair of pulleys, a belt mounted on said pulleys to move in horizontal planes therebetween, means for actuating one of said pulleys, said belt being arranged to support and feed a filled sausage casing, auxiliary means actuated by said belt and arranged to engage the upper side of said filled casing, supporting means beneath said belt, compressing means arranged above said belt to compress said filled casing against said supporting means, and means for varying the position of said auxiliary feeding means.

30. In apparatus of the class described, a series of pulleys arranged in alinement with each other, a pair of endless belts mounted on said pulleys, said belts being spaced apart, a supporting member mounted between said belts, said belts being arranged to advance a filled sausage casing from one belt to the other over said supporting member, means for intermittently actuating said belts, means for forming said sausage casing into a series of connected links while supported on one of said belts, and means for twirling alternate links alternately with the operation of said belts when in position on said supporting member.

31. In apparatus of the class described, a series of pulleys arranged in alinement with each other, a pair of endless belts mounted on said pulleys, said belts being spaced apart, a supporting member mounted between said belts, said belts being arranged to advance a filled sausage casing from one belt to the other over said supporting member, means for intermittently actuating said belts, means for forming said filled casing into a series of connected links while supported on one of said belts, twirling means disposed on opposite sides of said supporting member, means for moving said twirling means into contact with one of said links in position on said supporting member when said belts are at rest, means for operating said twirling means to rotate said link, and means to move said twirling means out of contact with said link after the twirling operation has been completed.

32. In apparatus of the class described, a series of pulleys arranged in alinement with each other, a pair of endless belts mounted on said pulleys, said belts being spaced apart, a supporting member mounted between said belts, said belts being arranged to advance a filled sausage casing from one belt to the other over said supporting member, means for intermittently actuating said belts, means for forming said filled casing into a series of connected links while supported on one of said belts, twirling means disposed on opposite sides of said supporting member, means for moving said twirling means into contact with one of said links in position on said supporting member when said belts are at rest, means for operating said twirling means to rotate said link, holding means arranged to engage the links at each end of the one being twirled, and means to move said twirling means out of contact with said link after the twirling operation has been completed.

33. In apparatus of the class described, a series of pulleys arranged in alinement with each other, a pair of endless belts mounted on said pulleys, said belts being spaced apart, a supporting member mounted between said belts, said belts being arranged to advance a filled sausage casing from one belt to the other over said supporting member, means for intermittently actuating said belts, means for forming said filled casing into a series of connected links while supported on one of said belts, twirling means disposed on opposite sides of said supporting member, resiliently actuated means for moving said twirling means into contact with one of said links in position on said supporting member when said belts are at rest, means for operating said twirling means to rotate said link, means to move said twirling means out of contact with said link after the twirling operation has been completed, arresting means for opposing the movement of said twirling means away from said link immediately after engagement therewith, and means for rendering said arresting means inoperative prior to the movement of said twirling means away from said link.

34. In apparatus of the class described, a pair of pulleys, an endless belt mounted thereon, means for actuating one of said pulleys, a pair of compressing members spaced apart above said belt, supporting means disposed beneath said belt opposite said compressing members, means for arresting the movement of said belt, and means actuated when said belt is at rest for moving said compressing members toward said belt to compress a filled sausage casing supported thereon.

35. In apparatus of the class described, a pair of pulleys, an endless belt mounted thereon, means for actuating one of said pulleys, a pair of compressing members spaced apart above said belt, supporting means disposed beneath said belt opposite said compressing members, means for arresting the movement of said belt, means for moving said compressing members toward said belt to compress a filled sausage casing supported thereon, and cam actuated means for operating said last named means when said belt is at rest.

36. In apparatus of the class described, a pair of pulleys, an endless belt mounted thereon, means for actuating one of said pulleys, a pair of compressing members spaced apart above said belt, supporting means disposed beneath said belt opposite said compressing members, means for arresting the movement of said belt, means actuated when said belt is at rest for moving said compressing members toward said belt to compress a filled sausage casing supported thereon, and means to vary the spaced relation of said compressing means.

37. In apparatus of the class described, a pair of pulleys, an endless belt mounted thereon, means for actuating one of said pulleys, a pair of compressing members spaced apart above said belt, supporting means disposed beneath said belt opposite said compressing members, means for arresting the movement of said belt, means actuated when said belt is at rest for moving said compressing members toward said belt to compress a filled sausage casing supported thereon, and means to vary the limits of movement of said compressing means.

38. In apparatus of the class described, a pair of pulleys, an endless belt mounted thereon, means for intermittently actuating said belt, compressing means spaced apart and movable toward said belt for compressing a filled sausage casing on said belt and forming a link between the points of compression, means actuated simultaneously with said compressing means for holding two alternate links formed by a preceding operation of said compressing means, and means for twirling a link disposed between said alternate links, said compressing means, holding means, and twirling means being operated when said belt is at rest.

39. In apparatus of the class described, a pair of pulleys, an endless belt mounted thereon, means for intermittently actuating said belt, compressing means spaced apart and movable toward said belt for compressing a filled sausage casing on said belt and forming a link between the points of compression, means actuated simultaneously with said compressing means for resiliently holding two alternate links formed by a preceding operation of said compressing means, means for varying the spaced relation of said holding means, and means for twirling a link disposed between said alternate links, said compressing means, holding means, and twirling means being operated when said belt is at rest.

40. In apparatus of the class described, a pair of pulleys, an endless belt mounted thereon, means for intermittently actuating said belt, compressing means spaced apart and movable toward said belt for compressing a filled sausage casing on said belt and forming a link between the points of compression, means actuated simultaneously with said compressing means for holding two alternate links formed by a preceding operation of said compressing means, and means for twirling a link disposed between said alternate links, said compressing means, holding means, and twirling means being operated when said belt is at rest, said belt being provided with a resilient cover arranged to coact with the filled casing supported and advanced thereby.

41. In apparatus of the class described, two movable frames, two series of pulleys each mounted on one of said frames, twirling belts mounted on said pulleys, means to actuate said twirling belts, means to move said movable frames toward each other, and means for automatically permitting a variation in the movement of said frames.

42. In apparatus of the class described, a member adapted to engage and move a filled sausage casing, said member comprising means for permitting a limited movement of the body portion thereof without substantial movement of the part in contact with the casing.

43. In apparatus of the class described, a member adapted to engage and move a filled sausage casing, said member having an elastic part adapted to permit a limited relative movement of said member and said casing when in contact, and means for actuating said member.

44. In apparatus of the class described, means for supporting a sausage link, resiliently actuated twirling means movable toward said link, and arresting means for opposing movement of said twirling means away from said link immediately after contact therewith.

45. In apparatus of the class described, means for supporting a sausage link, resiliently actuated twirling means movable toward said link, arresting means for opposing movement of said twirling means away from said link immediately after contact therewith, and cam actuated means for controlling the operation of said twirling means and said arresting means.

46. In apparatus of the class described, a pair of oppositely disposed twirling frames, twirling belts mounted on said frames to move in opposite directions on opposite sides of a sausage link, means for actuating said twirling belts, means for moving said frames toward said link, and independent means for moving said frames away from said link.

47. In apparatus of the class described, a pair of oppositely disposed twirling frames, twirling belts mounted on said frames to move in opposite directions on opposite sides of a sausage link, means for actuating said twirling belts, means for moving said frames toward said link, independent means for moving said frames away from said link, arresting means arranged to oppose the movement of said frames away from said link immediately after engagement therewith, and means for rendering said arresting means inoperative before the actuation of said means for moving said twirling frames away from said link.

48. In apparatus of the class described, means for constructing a filled sausage casing to form the same into links, means for varying the length of the links, and adjustable twirling means operated intermittently for imparting to links of different length the same number of rotations.

49. In apparatus of the class described, means for feeding a filled sausage casing, means constricting said casing, means for twirling links formed by said constricting means, means for adjusting said constricting means to form links of different lengths, means for intermittently operating said feeding means in alternation with said constricting means and said twirling means, and means for controlling said last-named means and said holding and twirling means to give the same number of rotations to links of different lengths.

In testimony whereof, we have subscribed our names.

LOUIS REISFELD.
DAVID G. REICHMAN.